Feb. 7, 1956 M. J. PURETIC 2,733,530
METHOD OF OPERATING A PURSE SEINE WITH A POWER BLOCK UNIT
Filed Aug. 16, 1954 2 Sheets-Sheet 1
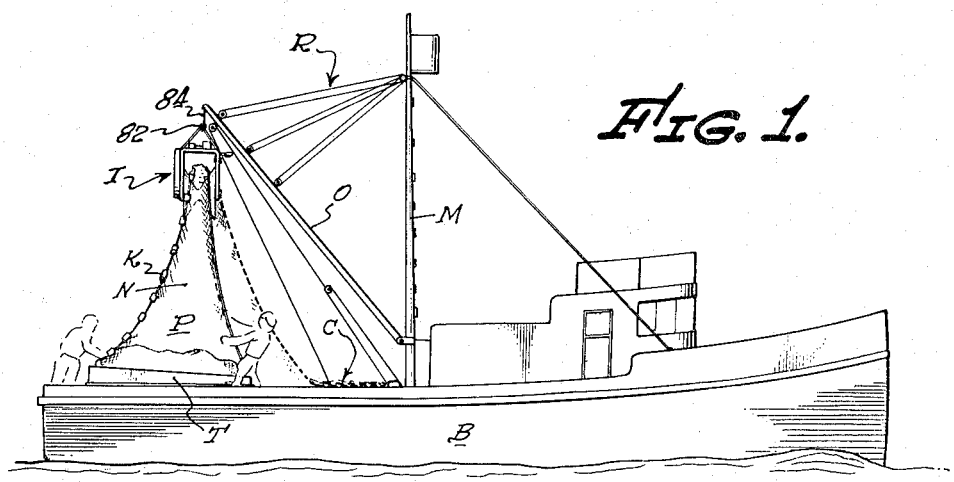
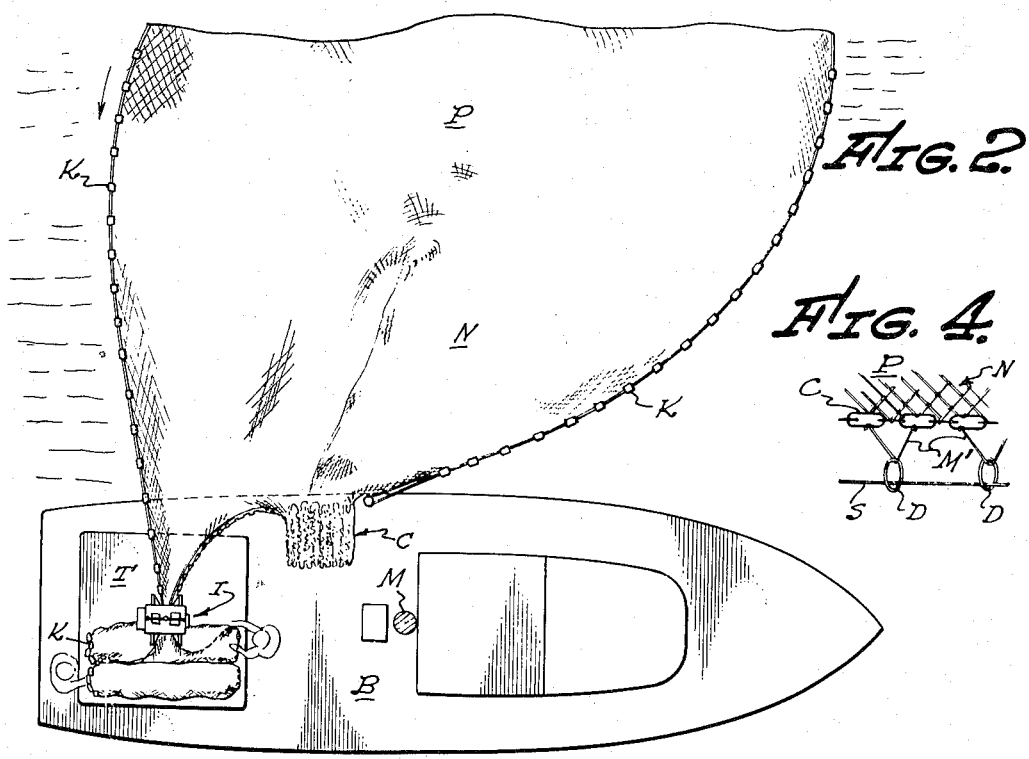
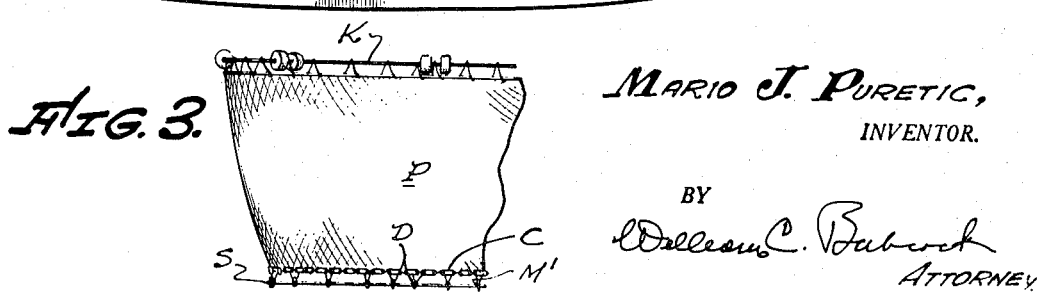
Mario J. Puretic,
INVENTOR.
BY
William C. Babcock
ATTORNEY.

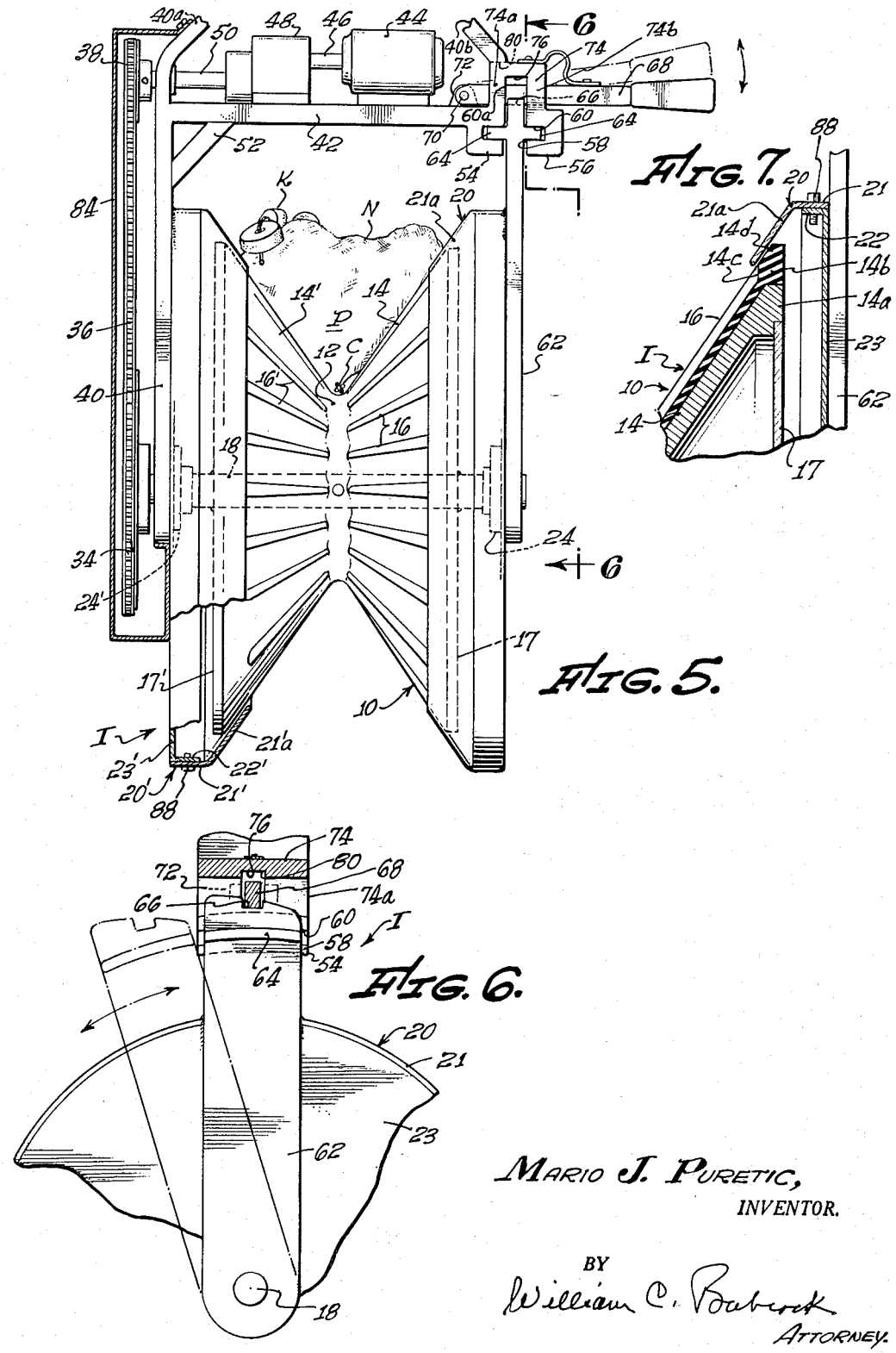

2,733,530
METHOD OF OPERATING A PURSE SEINE WITH A POWER BLOCK UNIT

Mario J. Puretic, Torrance, Calif.

Application August 16, 1954, Serial No. 450,094

4 Claims. (Cl. 43—8)

The present invention relates generally to the field of commercial fishing, and more specifically to a method of using a power operated device whereby roundhaul seines, particularly purse seines, may be drawn from the sea onto the boat deck, and by means of which the fish contained therein may be efficiently disposed of within approximately one-half the time normally required for this operation when the present-day equipment is employed.

A major object of the present invention is to provide a method of using a power operated device so that the device may be removably mounted at an elevated position on a purse seine boat, preferably on the boom thereof, which device upon actuation, will concurrently draw a net into the boat in such a manner as to permit both the cork and lead (or chain) lines thereof to set the seine or retrieve same in a minimum of time.

Another object of the invention is to minimize the hazard of possible tearing of the net or other damage thereto by attacking sharks in an attempt to reach the fish contained therein, due to the fact that the length of time required in retrieving the seine is appreciably diminished.

A further object of the invention is to provide a method of using a device that supplies power means for retrieving a seine after it has been set in such a manner as to not substantially affect modern purse seining operations as commonly practiced by commercial fisherman, except that it reduces the manual labor involved in that fewer men are required to handle the net as it is brought aboard and thereby frees more men for other necessary tasks and greatly increases the efficiency of the crew as a whole.

A still further object of the invention is to provide a method of using a power operated device so that the device is capable of withdrawing a purse seine from the sea with a heavy catch contained therein, in such manner as to permit a portion of the seine to be easily disposed in or removed therefrom when the device is lying on the boat deck.

An additional object of the invention is to provide a method of using a power actuated mechanism with a purse seine net in which a continuous, uniformly distributed force is exerted thereon as it is drawn into a boat, with the net together with the cork line and lead line thereof during passage through the device being steadily subjected to a constant rate of withdrawal whereby the net will not be torn or otherwise damaged.

Yet another object of the invention is to provide a method for use in hauling purse seines aboard a vessel which replaces the more time-consuming conventional method of picking up this gear by means of a boom and slings, which method provides a saving in hauling time, increases the efficiency of purse seine fishing, and results in a great saving of fish and man power.

A still further object of the invention is to provide a method of using a power operated device so that said device may be utilized to handle the seine when the cork line thereof is in the sea and the lead line is stacked upon the deck of a vessel.

These and other objects and advantages of the invention will become apparent from the following description of a preferred form thereof, and the drawings illustrating same in which:

Figure 1 is an elevational view of a conventional purse seine boat showing the power operated device removably mounted on the boom thereof;

Figure 2 is a plan view of the vessel showing the seine in expanded position as it is drawn aboard by means of the power operated device;

Figure 3 is a fragmentary vertical cross-sectional view of a purse seine showing the manner in which it floats in a fish gathering position;

Figure 4 is a fragmentary elevational enlarged view of a lower portion of the seine;

Figure 5 is a front elevational view of the power operated device;

Figure 6 is a side elevational view of the device showing the hand-operated lever associated therewith that permits removal of the net therefrom or insertion thereon; and Figure 7 is a fragmentary vertical cross-sectional view of the upper guide portion of the power operated device which prevents tearing of the seine as it engages the moving portion of the invention.

Referring now to Figures 1, 2 and 3 of the drawings for the general arrangement of the invention, it will be seen that the conventional purse seine boat B illustrated therein is provided with a mast M and a boom O pivotally supported from the mast. The boom O is adapted to be positioned at the desired angle relative to the mast by conventional rigging R.

In Figures 1 and 2 the device generally designated by the reference letter I is shown removably supported on the upper extremity of the boom O, in which position it is adapted to haul a purse seine P (Figure 3) aboard the boat B. As is common practice in commercial fishing, as the net is drawn aboard, it is deposited onto a turntable T that is normally located in the stern of the vessel. The purse seine P, of which there are a number of types, in general comprises an elongate net or webbing of uniform mesh size that usually run from 1500 to 3000 feet in length. After circling of the vessel, the seine is set to catch fish between two free end portions thereof that are pulled together by means of a drawstring whereby the net extends outwardly in a looped fashion, as shown in Figure 2. When so disposed, the seine sinks below the water surface due to a chain or lead line C affixed to the lower edge of the net from which a number of longitudinally spaced bridle rings D are supported by flexible downwardly depending members M', as best seen in Figure 3. A purse cable S anchored to the boat is threaded through rings D. A cork line K is provided on the upper edge of the net N comprising the main body of the seine. Due to the natural characteristics thereof this cork line floats on the surface of the water and maintains the top portion of the net in the above described position. Before the purse seine is set, it is supported on the turntable T, and as the boat B travels in an arcuate path, the seine is paid out into the water. When all of the seine is placed in the water it is supported therein with the webbing hanging nearly straight down between the cork and lead lines in the form of a large loop.

After the looped net surrounds a school of fish the net is pursed by pulling the purse cable S whereby the bottom of the net below the lead line, or the lower edge portions thereof, are puckered to close the net and retain the catch therein. The lead line C or chain, as the case may be, is stacked on the deck (Figure 2) as the lower portion of the seine is closed.

When the seine P is fully pursed, it may then be drawn toward the boat B by means of the detailed construction which is shown in Figure 5. The block preferably is disposed on its side on the boat deck in such a position to permit engagement of the seine thereby. After such engagement, the block is hoisted to an elevated position, preferably on the outer end of boom O, above the center point of the turn-table T. Upon actuation in this position, the block I draws the cork line K and the seine from the sea and the lead line from the deck to deposit same on the center of the turntable T where it may be easily caused to fall in the desired stacking arrangement.

It will be readily apparent that a very considerable amount of time may be saved by means of the above described operation over the older method by which sections of the seine are intermittently lifted from the sea and lowered onto the deck by use of a sling mounted on the end of the boom.

In addition, it is not necessary to alter the normal manner of handling a purse seine when the power block is employed, but it makes possible a more rapid handling of the catch with less physical effort on the part of the crew. The increased rate at which the seine may be hauled from the sea into the boat materially decreases the possibility of loss of fish caught from attack by sharks or damage to the seine by such attack whereby large portions of the catch may slip through sections of the net torn by the sharks. Loss of fish in this manner not only amounts to waste of valuable natural resources, but also results in pollution of the fishing grounds and ultimate disadvantage to the commercial fisherman.

In detailed structure, the power block that is used in the method of the present invention comprises a relatively large spool 10 having a central portion 12 of a minimum diameter from which two oppositely disposed identical annular flanges 14 and 14' taper outwardly in increasing diameter. A plurality of circumferentially spaced, radially disposed ribs 16 and 16' are formed on the exterior faces of the flanges 14 and 14' respectively, which ribs terminate a short distance from the outer circumferential edges thereof. As the sides of the spool 10 are identical, only one side thereof will accordingly be described in detail.

Flange 14, as may best be seen in Figure 7, terminates in a relatively heavy rim 14a on which a ring 14b of resilient material such as rubber is mounted. Ring 14b has a face 14c against which the ribs 16 abuttingly terminate, and the second face 14d of ring 14b situated above face 14c thereof, tapers upwardly and outwardly. A heavy annular plate 17 is mounted within the confines of rim 14a and is welded or otherwise affixed thereto. A shaft 18 is provided that extends through the centers of the two plates 17 and 17', to which shaft these plates are rigidly affixed.

An annulus-shaped shield 20 is also provided that includes a cylindrical shell 21 of relatively narrow width from which an extension 21a slopes downwardly and inwardly over ring face 14d with which it is in rotatable sliding contact, as shown in Figure 7. Shell 21 is removably mounted on an annular inwardly extending lip 22 formed on the circumferential edge of a rigid circular plate 23.

Two bearings 24 and 24' are rigidly mounted on the plates 23 and 23' respectively, which bearings are in alignment with openings formed in the center of each plate. Shaft 18 is rotatably supported in bearings 24 and 24', and that end of shaft 18 nearest bearing 24' has a gear 34 mounted thereon that is driven by an endless chain belt 36 extending upwardly to a gear 38. Gear 38 is driven by means that will later be described in detail. A rigid upright 40 is welded or otherwise secured to the exterior surface of plate 23'. One end of a horizontally disposed support 42 is rigidly affixed to the upper portion of upright 40.

A prime mover 44 is mounted on support 42, and may be either an electric motor, air motor, small gasoline engine, or other power generating means normally employed for the actuation of portable machine units. Should it be desired, either a flexible or rigid shaft may be extended upwardly from a power unit located below deck of the vessel to supply the necessary power to the prime mover 44 located above deck. A shaft 46 projects from the prime mover 44 to a speed reduction unit 48 from which a second shaft 50 and on which the driving gear 48 is mounted. Support 42 is preferably braced against the weight of prime mover 44 and unit 48 by means of a diagonally disposed reinforcing member 52, as shown in Figure 5.

On the end of support 42 opposite that connected to upright 40, two downwardly depending, oppositely disposed L-shaped members 54 and 56 are formed that define a vertical slot 58 therebetween which communicates with a second horizontal elongate slot 60, also defined by members 54 and 56. A second upright 62 is provided that is affixed to plate 23. Near the upper extremity of upright 62, outwardly extending lugs 64 are oppositely disposed that are of such dimensions as to be slidably received within the confines of slot 60 when upright 62 is positioned within slot 58 (Figure 5). A vertical notch 66 is formed in the upper extremity of upright 62 that, as may be seen in Figure 6, may be removably engaged by a latch bar 68, which latch bar is pivotally supported on the inwardly disposed end portion thereof by a pin 70. Pin 70 also engages an opening provided in an upwardly projecting member 72, the downward edge of which is welded or otherwise affixed to the upper surface of support 42. A U-shaped member 74 is made a part of support 42, and occupies an inverted position in which the space 76 between the two lugs 74a and 74b thereof is in alignment with a third slot 60a extending upwardly from the second slot 60. A slot 80 extends downwardly through a central portion of U-shaped member 74, and the slot is so disposed as to permit latch bar 68 to move up and down therein. It will be apparent from Figure 6 that when the latch bar is moved to a downward position it will engage the notch 66 formed in the upright 62, and hold this upright in the same vertical plane as that of upright 40. An extension 40a is provided on the upper portion of upright 40, which extension angles upwardly and inwardly and terminates in an eye or other suitable supporting member 82 that may be engaged by a cable 83 to support the invention I as a whole from the end of boom O as shown in Figure 1. A second extension 40b, identical to extension 40a, projects upwardly and inwardly from U-shaped member 74, and is rigidly affixed at the upper extremity thereof to a supporting member 82. As a safeguard against personal injury during operation of the invention, a lightweight protective shield 84 is provided that is a conventional chain and gear guard, and is removably affixed to the upright 40 and extension 40a by conventional means to prevent accidental personal contact with the driving gear 34, belt 36, and driven gear 38.

The method comprising the invention is extremely simple. After the purse seine P has been set, it is pursed by manually pulling in the lead C and coiling same on the deck of the vessel B (Figure 2). The cable 84 is manipulated to disposed the power block I either on the deck or suspended sufficiently close thereto as to permit the innermost portion of the seine P to be strung over the spool 10. The power block I is now raised by cable 84 to the position shown in Figure 1 in which the outer end of the boom, as well as the power block are in an elevated position over substantially the center of the turntable T. When the block I is so disposed, a portion of the purse seine P drapes downwardly therefrom to the turntable T, as shown in Figure 2.

Thereafter, upon rotation of the prime mover 44 and resultant rotation of spool 10, the ribs 16 frictionally engage that portion of the seine P disposed between flanges 14 and 14' with sufficient force that lead line C is pulled upwardly from the deck of the vessel B, and the seine and cork line K are hauled inwardly thereto from the sea to concurrently pass over the spool 10. The lead line C, seine P, and cork line K assume the generally triangular shaped transverse cross section shown in Figure 5 as they pass over the spool 10, and in passing over the spool, they move downwardly and are transferred to the turntable T where two crew members arrange the net in proper folds on the turntable whereby the seine will be ready for re-use.

It is impossible for water and foreign materials to pass downwardly to bearings 24 and 24' as the seine is hauled in from the sea over the roller 10, due to the fluid-tight seal effected by shields 20 and 20' with the resilient rings 14b and 14b', respectively. When it is desired to pivot upright 62 into a lower position where the seine may be slipped off the roller 10 or placed thereon, the latch bar 68 is simply moved upwardly to disengage it from recess 66. Upright 62, plate 23, and shield 20 may then be rotated as an integral unit on bearing 24 whereby the upright 62 will be placed in the desired lowered position. Should access to bearing 24 or ring 14b be desired, threaded members 88 which engage both shield 20 and lip 22 are removed, and plate 23 and upright 62 moved outwardly to cause disengagement of bearing 24 from shaft 18.

Although the power block herein shown and described and the method of using same are fully capable of achieving the objects and providing the advantages hereinbefore described, it is to be understood that they are merely the presently preferred embodiments of my invention and that I do not mean to be limited to the details of construction with respect to the foregoing description other than as defined in the appended claims.

I claim:

1. A method of utilizing power means to haul a set purse seine having a cork line and a lead line aboard a purse seiner provided with a turntable and boom that may be disposed thereover comprising: manually drawing said lead line aboard said purse seiner and stacking same adjacent said turntable; providing a rigid rotatable surface that defines a V-shaped space through which a portion of said seine, cork line and lead line may concurrently move when said seine is in functional engagement with said surface; placing the most inwardly disposed portion of said seine and cork line in said V-shaped space together with a part of said lead line; maintaining said rotatable surface due to use of said boom at an elevated position over said turntable; causing said surface to rotate by power means when so disposed over said turntable to draw said lead line upwardly from said position on said vessel and said seine and cork line upwardly from the sea, and concurrently lower said lead line, cork line and seine onto said turntable in positions where said purse seine may be set.

2. A method of utilizing power means to haul a net from a first expanded position to a second position where it can be disposed in stacked arrangement, comprising: providing a rigid rotatable surface of such configuration that a section of said net can be compacted to frictionally engage the same during passage therethrough; placing an end portion of said net on said surface; maintaining said surface at an elevation sufficient to permit a portion of said net to hang downwardly as a column that can be guided into said stacked arrangement with the weight of said column being such as to cause compaction; rotating said surface by power means; and guiding said net from said first position onto said surface as said surface rotates.

3. A method as defined in claim 2 in which said surface is so pivotally supported that it can move outwardly in a vertical plane to permit said net to contact the maximum area of said surface during passage of said net thereover.

4. A method as defined in claim 2 in which said surface is of such size and shape that said net is sufficiently compacted in passing thereover that the frictional engagement of said net and surface will prevent any appreciable slippage therebetween.

References Cited in the file of this patent

UNITED STATES PATENTS

| | | |
|---|---|---|
| 785,139 | Wilhelmi | Mar. 21, 1905 |
| 2,258,889 | Graham | Oct. 14, 1941 |
| 2,499,224 | Lutz | Feb. 28, 1950 |
| 2,570,285 | Sundberg | Oct. 9, 1951 |
| 2,625,373 | Hunt | Jan. 13, 1953 |
| 2,649,282 | Fate, Jr. | Aug. 18, 1953 |
| 2,662,732 | Allenbaugh | Dec. 15, 1953 |